United States Patent [19]

Thomas et al.

[11] Patent Number: 5,534,217

[45] Date of Patent: *Jul. 9, 1996

[54] METHOD OF MAKING TOOTHED BELTS FORMED MAINLY OF THERMOPLASTIC MATERIAL

[75] Inventors: Danny L. Thomas, Forsyth; Clinton L. Bishop, Springfield, both of Mo.

[73] Assignee: Dayco Products, Inc., Dayton, Ohio

[*] Notice: The term of this patent shall not extend beyond the expiration date of Pat. No. 5,392,831.

[21] Appl. No.: 276,295

[22] Filed: Jul. 18, 1994

Related U.S. Application Data

[62] Division of Ser. No. 110,177, Aug. 20, 1993, Pat. No. 5,392,831, which is a continuation of Ser. No. 844,361, Mar. 2, 1992, abandoned.

[51] Int. Cl.⁶ .................. F16G 1/00; F16G 1/28; F16G 5/20
[52] U.S. Cl. .......... 264/516; 264/230; 264/313; 264/342 R; 156/138; 474/205
[58] Field of Search ............ 264/230, 342 R, 264/313, 500, 512, 516; 156/138, 140, 141, 173, 245; 474/205, 260, 264, 268

[56] References Cited

U.S. PATENT DOCUMENTS

| 3,078,206 | 2/1963 | Skura | 156/140 |
|---|---|---|---|
| 3,766,146 | 10/1973 | Witsiepe | 528/301 |
| 3,888,132 | 6/1975 | Russ, Sr. | 474/205 |
| 4,414,047 | 11/1983 | Wetzel et al. | 156/138 |
| 4,583,963 | 4/1986 | Marsh et al. | 474/205 |
| 4,617,075 | 10/1986 | Wetzel et al. | 156/138 |
| 4,626,232 | 12/1986 | Witt | 156/138 |

OTHER PUBLICATIONS

Brady et al., Materials Handbook, 12th ed., p. 813.

Primary Examiner—Catherine Timm
Attorney, Agent, or Firm—Joseph V. Tassone

[57] ABSTRACT

A method of making tooth belts by formation thereof about the outer peripheral surface of a building drum having a generally cylindrical configuration and a surface defining a series of parallel, tooth-shaped grooves. The belts are formed by wrapping a fabric circumferentially around the building drum and winding a cord of tensile material helically about the fabric. A layer of thermoplastic material is formed about the cord of tensile material, and a cord of shrink material is wrapped helically about the layer of thermoplastic material. The shrink material has a higher softening temperature than the thermoplastic material and will shrink at a temperature below its softening temperature. Pressurized steam is applied to the shrink material at a temperature below its softening temperature and between the softening temperature and the melting temperature of the thermoplastic material. This shrinks the shrink material and extrudes a thermoplastic material through the tensile material, against the fabric and into the tooth-shaped groves of the building cylinder.

3 Claims, 4 Drawing Sheets

METHOD OF MAKING TOOTHED BELTS FORMED MAINLY OF THERMOPLASTIC MATERIAL

CROSS REFERENCE TO RELATED APPLICATIONS

This is a division, of application Ser. No. 110,177, filed Aug. 20, 1993 now U.S. Pat. No. 5,392,831 which, in turn, is a continuation patent application of its parent patent application, Ser. No. 844,361, filed Mar. 2, 1992, now abandoned in favor of said continuation application.

BACKGROUND OF THE INVENTION

1. Field of the Invention

This invention relates to a new belt construction and to a new method of making the same.

2. Prior Art Statement

It is known to provide a toothed belt construction formed mainly of thermoplastic material wherein the belt construction is made by injection molding the thermoplastic material after the thermoplastic material has been heated to a temperature above its melting temperature.

It is also known to form a belt construction of uncured rubber material by disposing at least one layer of the uncured rubber material about the outer peripheral surface of a building drum that has the outer peripheral surface thereof defined by alternating teeth and grooves, and then forcing the one layer of uncured rubber material toward the drum while the temperature of the one layer of uncured rubber material is above a certain softening temperature thereof and below a vulcanizing temperature thereof so as to cause at least part of the one layer of uncured rubber material to exude into the grooves to form at least part of the plurality of teeth of the belt construction. For example, see the U.S. Pat. to Skura, No. 3,078,206 and the U.S. Pat. to Marsh et al, No. 4,583,963.

However, it is applicants' belief that it is not known that a toothed belt construction formed mainly of thermoplastic material can be formed by the method of the aforementioned Pat. to Skura, No. 3,078,206.

SUMMARY OF THE INVENTION

It is one feature of this invention to provide a new toothed belt construction formed mainly of thermoplastic material without utilizing an injection molding process or a high pressure compression molding operation wherein the thermoplastic material must be in the molten state thereof.

In particular, it was found according to the teachings of this invention that a conventional building drum arrangement for forming toothed belt constructions from uncured rubber layers can be utilized to form toothed belt constructions formed mainly of thermoplastic material if the temperature of the thermoplastic material is maintained at a temperature above its softening temperature and below its melting temperature.

For example, one embodiment of this invention comprises a method of making a belt construction mainly of thermoplastic material and having opposed sides one of which comprises a plurality of teeth, the method comprising the steps of disposing at least one layer of the thermoplastic material about the outer peripheral surface of a building drum that has the outer peripheral surface thereof defined by alternating teeth and grooves, and then forcing the one layer of thermoplastic material toward the drum while the temperature of the one layer of thermoplastic material is above its softening temperature and below its melting temperature so as to cause at least part of the one layer of thermoplastic material to exude into the grooves to form at least part of the plurality of teeth.

Accordingly, it is an object of this invention to provide a new method of making a belt construction mainly of thermoplastic material, the method of this invention having one or more of the novel features of this invention as set forth above or hereinafter shown or described.

Another object of this invention is to provide a new belt construction formed mainly of thermoplastic material, the belt construction of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
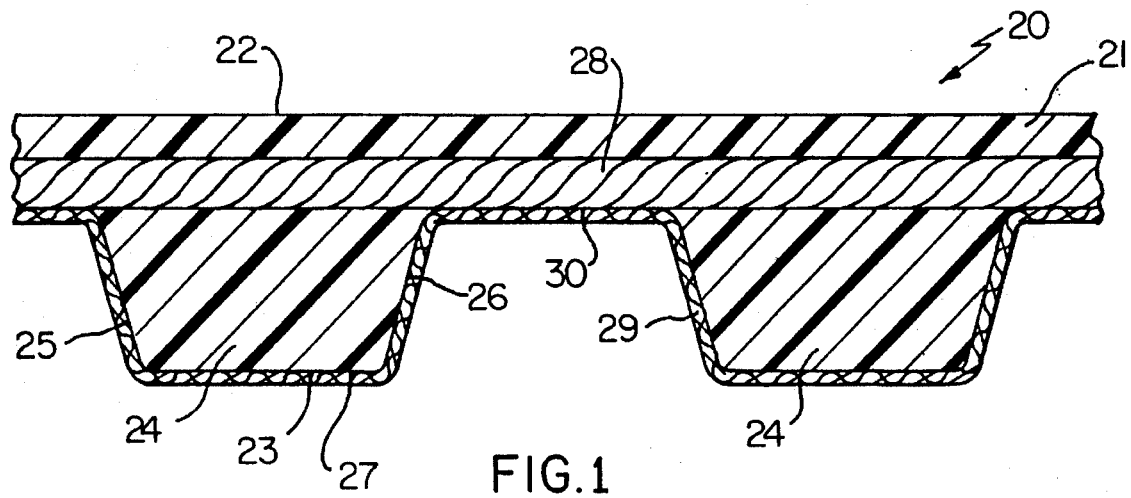
FIG. 1 is a fragmentary cross-sectional view illustrating the new belt construction of this invention.

While the various features of this invention are hereinafter illustrated and described as being particularly adapted to provide toothed belt constructions having a particular profile for the teeth thereof, it is to be understood that the various features of this invention can be utilized singly or in various combinations thereof to provide belt constructions with teeth having other shapes as desired.

Therefore, this invention is not to be limited to only the embodiments illustrated in the drawings, because the drawings are merely utilized to illustrate some of the wide variety of uses of this invention.

Referring now to FIG. 1, the new belt construction of this invention is generally indicated by the reference numeral 20 and comprises a belt body 21 formed of thermoplastic material, that had initially comprised one or more layers of like or dissimilar thermoplastic materials as desired, and defining opposed surface means 22 and 23 with the surface means 22 being generally flat while the surface means 23 defines a plurality of teeth 24 which in the embodiment illustrated in FIG. 1 have angled sides 25 and 26 and substantially flat bottoms 27.

The belt construction 20 further comprises a reinforcing tensile means 28 formed from one or more reinforcing cords of any suitable material, such as thermoplastic material, and arranged in a helical manner in a manner well known in the art and hereinafter set forth.

In addition, the belt construction 20 also comprises a fabric means 29 that generally lines the surfaces 25, 26 and 27 of the teeth 24 as well as the land areas 30 between the teeth 24 all in a manner well known in the art and for well known purposes. For example, see the aforementioned U.S. Pat. to Marsh et al, No. 4,586,963 whereby this U.S. patent is being incorporated into this disclosure by this reference there to.

As previously stated, the belt construction 20 of this invention is uniquely formed by utilizing the well known building drum and container arrangement of the aforementioned U.S. Pat. to Skura, No. 3,078,206 whereby this U.S. patent is also being incorporated into this disclosure by this reference thereto.

Figure 3:
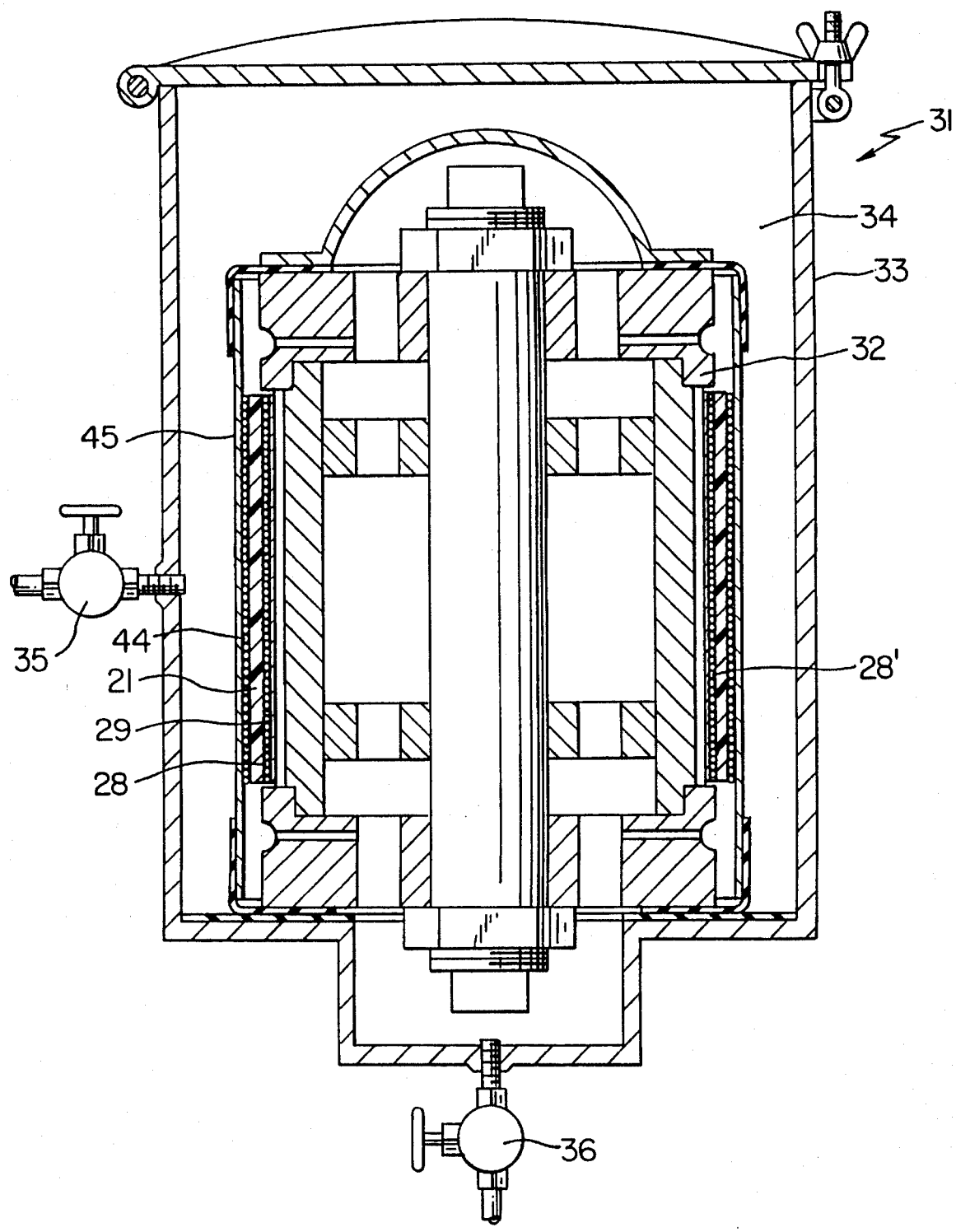
FIG. 3 is a cross-sectional view illustrating the building drum of FIG. 2 disposed in a container for applying steam and pressure to the building drum.

Such prior known apparatus is generally indicated by the reference numeral 31 in FIG. 3 and comprises a generally cylindrical building drum 32 formed of metallic material and being adapted to be disposed within a metallic container 33 which is adapted to have steam injected into a cavity 34 thereof through suitable valve means 35. In addition, steam can be injected into the container 33 through another valve means 36 in order to heat the interior of the drum means 32 as well as to provide means for venting liquid from the container 33 if desired.

Since the details of the structure and operation of the apparatus 31 is well known, only the details thereof necessary to understand the features of this invention will now be described.

Figure 2:
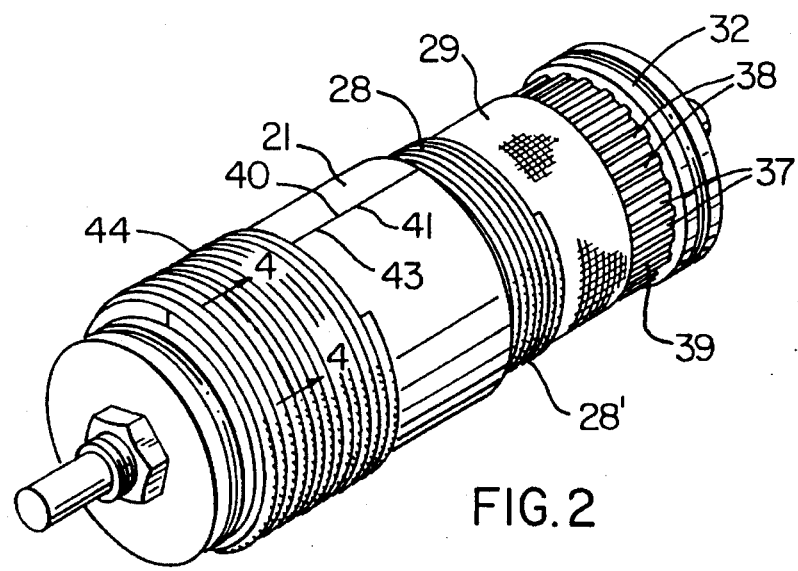
FIG. 2 is a perspective view illustrating how the belt construction of FIG. 1 is formed on a building drum arrangement.
Figure 4:
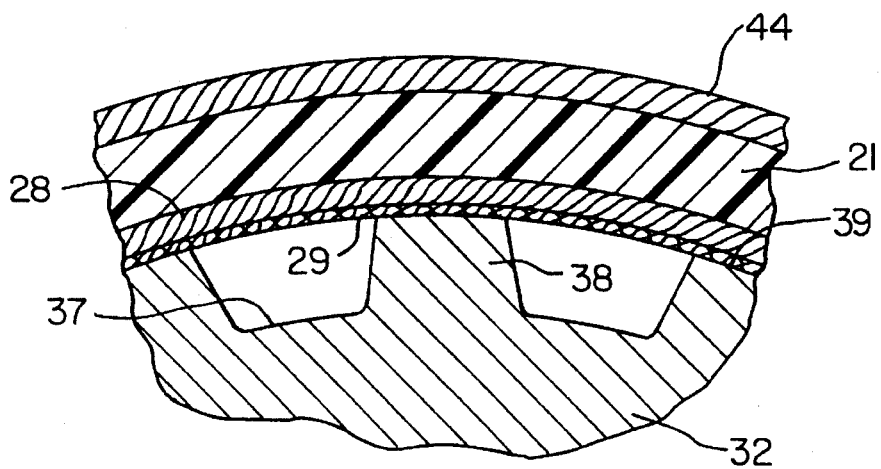
FIG. 4 is an enlarged fragmentary cross-sectional view taken on line 4—4 of FIG. 2.
Figure 6:
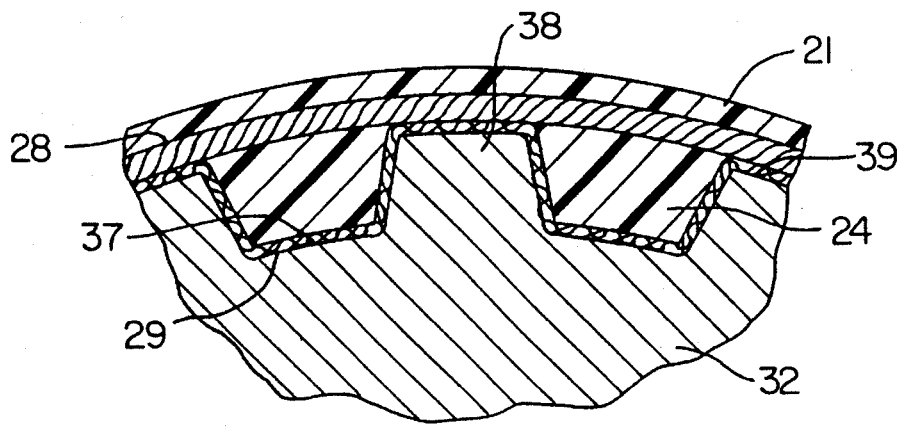
FIG. 6 is a view similar to FIG. 4 and illustrates the material on the building drum after the same has been forced toward the building drum by steam and pressure.
Figure 7:
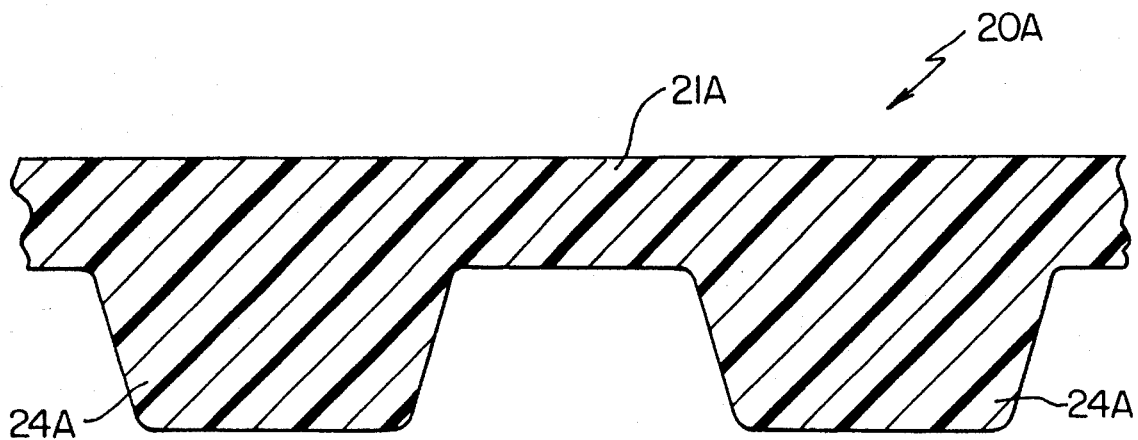
FIG. 7 is a view similar to FIG. 1 and illustrates another new belt construction of this invention.
Figure 8:
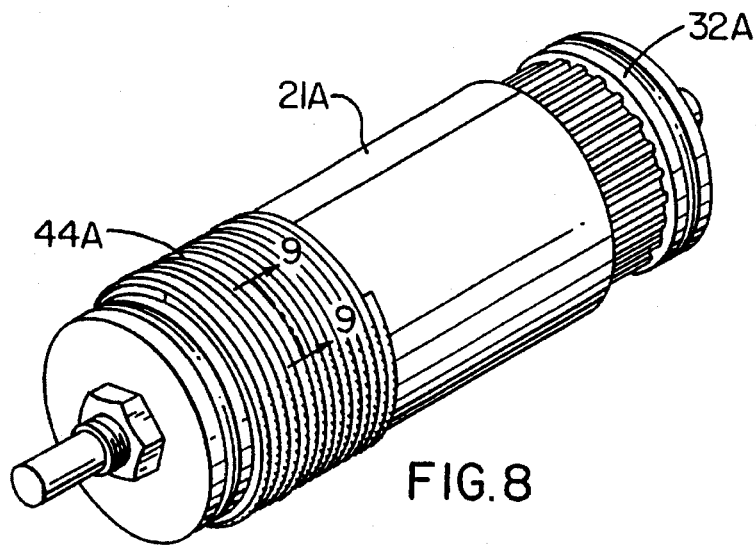
FIG. 8 is a view similar to FIG. 2 and illustrates how the material for forming the belt construction of FIG. 7 is disposed on a building drum.
Figure 9:
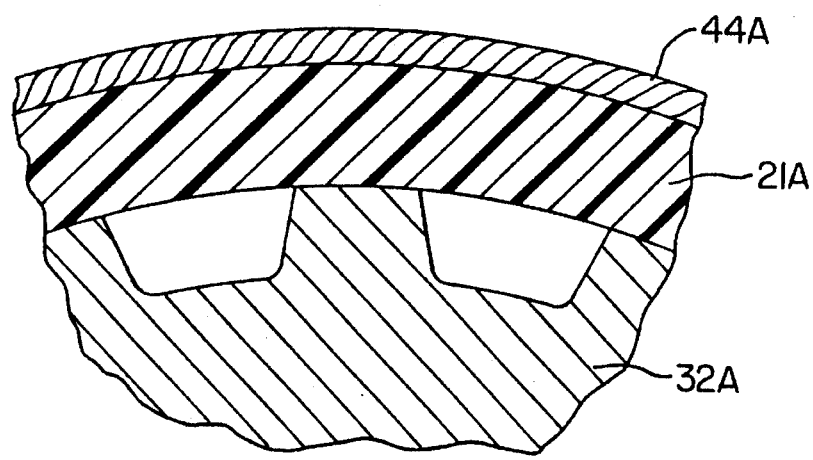
FIG. 9 is an enlarged fragmentary cross-sectional view taken on line 9—9 of FIG. 8.
Figure 10:
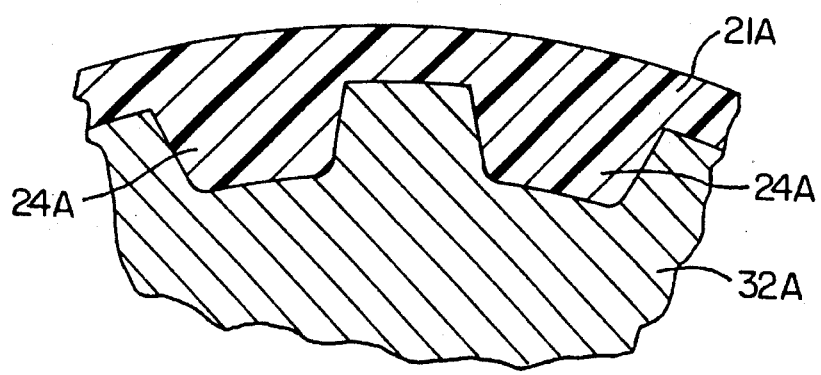
FIG. 10 is a view similar to FIG. 9 and illustrates how the material on the building drum of FIG. 8 is subsequently formed on the building drum to provide the belt construction of this invention that is set forth in FIG. 7.

As illustrated in FIG. 2, the building drum 32 has a plurality of grooves 37 and teeth 38 formed about the outer peripheral means 39 thereof as illustrated, the grooves 37 to subsequently form the belt teeth 24 as will be apparent hereinafter and as illustrated in FIGS. 4 and 6.

In order to form the belt construction 20 of this invention utilizing the apparatus 31, a layer of the fabric means 29 is first disposed or wrapped on the outer peripheral surface 39 of the drum 32 in the manner illustrated in FIGS. 2 and 4.

Figure 5:
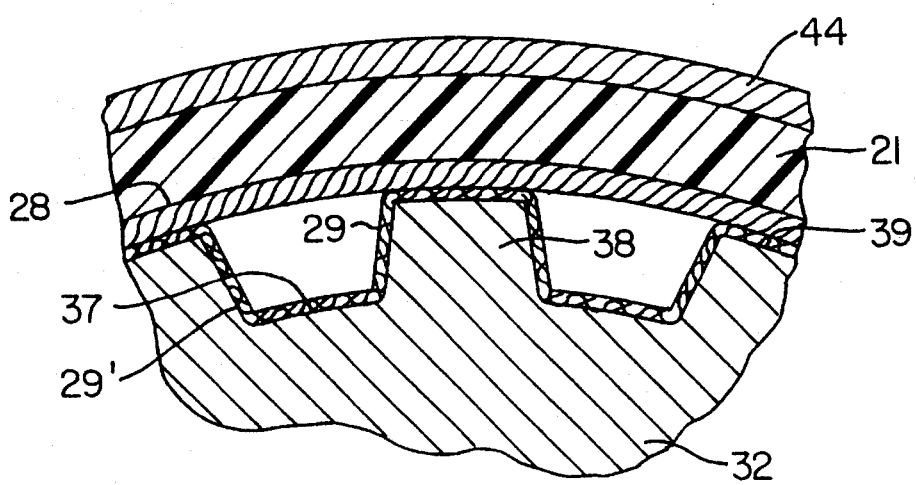
FIG. 5 is a view similar to FIG. 4 and illustrates another embodiment of the method of this invention.

However, it is to be understood that the fabric means 29 could be preformed so that the same would have teeth-shaped portions 29' as illustrated in FIG. 5 which initially line the grooves 37 of the building drum as illustrated in FIG. 5 when the fabric means 29 is disposed thereon.

Should the fabric means 29 not be preformed with the teeth-shaped portions 29', the fabric means 29 is formed of stretch material in a manner well known in the art so that the fabric means 29 will stretch and line the grooves 37 when forced therein by the exuding thermoplastic material as will be apparent hereinafter and as illustrated in FIG. 6.

In any event, after the fabric layer 29 is disposed on the drum 32, the tensile means 28 is helically wrapped thereon in the manner illustrated in FIG. 2 with the spacing between the adjacent coils 28' of the tensile means 28 being any desired amount as is well known in the art.

Thereafter, the thermoplastic material 21 is disposed or wrapped on the tensile means 28 in one or more layers thereof as desired and such material as illustrated in FIG. 2 could be so arranged that the same has opposed ends 40 and 41 disposed in abutting relation to define a longitudinal seam 43 as illustrated.

Thereafter, a shrink cord 44 is wrapped on top of the thermoplastic material 21 with or without an intermediate layer means of different thermoplastic material and fabric means (not shown) between the shrink cord 44 and the layer of thermoplastic material 21 for the purpose of subsequently applying pressure on the thermoplastic layer 21 in a direction that is radially toward the drum 32 as the shrink cord means 44 is heated in a manner hereinafter set forth, the shrink cord 44 and any aforementioned intermediate layer means not forming a part of the resulting belt construction 20.

Of course, it is to be understood that other heat shrinkable means than the heat shrinkable cord 44 could be utilized for the same purpose, as desired.

After the drum 32 has been wrapped in the manner illustrated in FIG. 2, the wrapped drum 32 can have a metallic or rubber-like bladder 45 disposed around the same so that the bladder 45 will exert radially inward pressure on the material disposed on the drum 32 when pressurized steam is injected into the chamber 34 by the valve means 35, the valve means 36 as previously stated being adapted to heat the interior of the drum 32 by injecting steam therein as desired.

In any event, the wrapped drum means 32 is heated to a temperature that is above the softening temperature of the thermoplastic material 21 and below the melting temperature thereof and such temperature causes the shrink cord 44 to shrink and in combination with the steam pressure acting against the bladder 45 to collapse the bladder 45 toward the drum 32, force the heated thermoplastic material 21 to exude between the coils 28' of the tensile means 28 and force the fabric means 29 into the grooves 37 of the drum 32 to form the teeth 24 as well as the remainder of the belt construction 20 in the manner illustrated in FIG. 6. Once the resulting belt sleeve has been formed on the drum 32 by the previously described heat and pressure, the drum 32 is removed from the container 33 and allowed to cool so that the belt sleeve can then be removed therefrom and the individual belt constructions 20 can be cut therefrom all in a manner well known in the art.

While the belt construction 20 of this invention has been described as utilizing steam pressure and the shrink cord means 44 to exude the heated thermoplastic material 21 through the tensile means 28 to form the teeth 24, it is to be understood that other means can be utilized to so force the heated thermoplastic material 21, such as a mechanical clam shell means etc., as long as the thermoplastic material 21 has been heated to a temperature above its softening temperature and below its melting temperature.

For example, one belt construction that has been formed according to the teachings of this invention has the thermoplastic material 21 thereof comprise a polyether blocked amide sold under the trademark PEBAX No. 3533 by Atochem North America, Inc. of Philadelphia, Pa. Such thermoplastic material has a softening point of approximately 165° F. and a melting point of approximately 306° F. It was found according to the teachings of this invention that this thermoplastic material 21 best formed the belt construction 20 of this invention when heated to approximately 14° F. above the mid point of those two temperatures or to approximately 250° F. for a time period of approximately 60 minutes when disposed in the container 33 in the manner illustrated in the drawings.

It was found that when forming the belt construction 20 of the aforementioned PEBAX thermoplastic material and utilizing a temperature below the desired 250° F. temperature resulted in incomplete teeth 24 in the resulting belt construction and when formed at a temperature above the desired 250° F. temperature resulted in air entrapment in the resulting belt construction 20.

In order to provide the desired 250° F. temperature in the container 33, saturated steam at 30 psi absolute will create the temperature of 250° F.

The tensile means 28 in such belt construction comprise a dacron-type 52 cord sold by the Du Pont Corporation of Wilmington, Del. and such cord has a softening point of approximately 474° F. which is of course well above the temperature utilized to form the belt construction 20.

Similarly, the shrink cord can be any suitable material and in the above example, the shrink cord comprised treated polyester 1000/2/3 cord which has a softening temperature well above the 250° F. utilized in forming the belt construction 20.

Another belt construction 20 of this invention that was formed in the above manner has the thermoplastic material 21 thereof comprising a segmented thermoplastic copoly-ether-ester elastomer containing terephthalate units sold as Hytrel No. 5556 by the Du Pont Corporation of Wilmington, Del., such thermoplastic material having a softening point of approximately 356° F. and a melting point of approximately 412° F. It was found that such belt construction 20 was formed best when that particular thermoplastic material was heated to approximately 5° F. above the softening point thereof or at approximately 361° F. This temperature can be created in the container 33 when the saturated steam is about 155 psi absolute.

Another belt construction 20 of this invention was formed from a low density polyethylene film which had a softening point of approximately 200° F. and a melting point believed to be above approximately 251° F. and formed best at a temperature of approximately 251° F.

Therefore, it can be seen that the normally used high steam pressure for the container 33 forming belt constructions of uncured rubber materials is not utilized by this invention, although it is to be understood that a high air pressure could be utilized together with other means of heating the thermoplastic material, as a high steam pressure would produce a temperature that is above the melting point temperature of the thermoplastic material.

While the belt construction 20 of this invention has been previously described as having the fabric means 29 and the tensile means 28, it is to be understood that one or both of the fabric means 29 and the tensile means 28 could be eliminated if desired.

For example, another thermoplastic belt construction of this invention is generally indicated by the reference numeral 20A in FIGS. 7–10 and parts thereof similar to the belt construction 20 previously described are indicated by like reference numerals followed by the reference letter "A".

As illustrated in FIGS. 7–10, it can be seen that the belt construction 20A can be formed in the same manner as the belt construction 20 previously described except only the thermoplastic material 21A is utilized on the building drum 32A together with the shrink cord means 44A so as to produce the teeth 24A all in the same manner as the belt construction 20 previously set forth whereby a further description of the details of the belt construction 20A and the method of forming the same need not be set forth.

Therefore, it can be seen that this invention provides a new method of making a belt construction mainly of thermoplastic material as well as providing a new belt construction formed of thermoplastic material.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A method of making toothed belts comprising the steps of:

(1) wrapping a fabric circumferentially around a building drum having a generally cylindrical configuration and a surface defining a series of parallel, tooth-shaped grooves;

(2) winding a cord of tensile material helically about said fabric, said tensile material being formed from a plastic having a high tensile strength and a high softening temperature;

(3) wrapping said cord of tensile material with a layer of thermoplastic material having a melting temperature substantially below said softening temperature of said tensile material and selected from the group consisting of polyether blocked amide having a softening temperature of about 165 deg. F. and a melting temperature of about 306 deg. F., segmented thermoplastic copolyester elastomer having a softening temperature of about 356 deg. F. and a melting temperature of about 412 deg. F. and a low density polyethylene having a softening temperature of about 200 deg. F. and a melting temperature of about 251 deg. F.;

(4) winding a cord of shrink material helically about said thermoplastic material, said shrink material being formed from a plastic having a higher softening temperature than said thermoplastic material;

(5) extruding said thermoplastic material through said tensile material to fill said grooves and stretch said fabric against said surface by applying pressurized steam to said shrink material at a temperature which is below the softening temperature thereof and between said softening temperature and said melting temperature of said thermoplastic material;

maintaining application of steam as aforesaid until said belts have been formed; and separating said belts from each other and from said drum.

2. A method according to claim 1 wherein said shrink material comprises polyester.

3. A method according to claim 2 wherein said thermoplastic material comprises polyether blocked amides said steam being supplied at a temperature of about 250 deg. F. and being maintained for a time period of about 60 minutes.

* * * * *